UNITED STATES PATENT OFFICE.

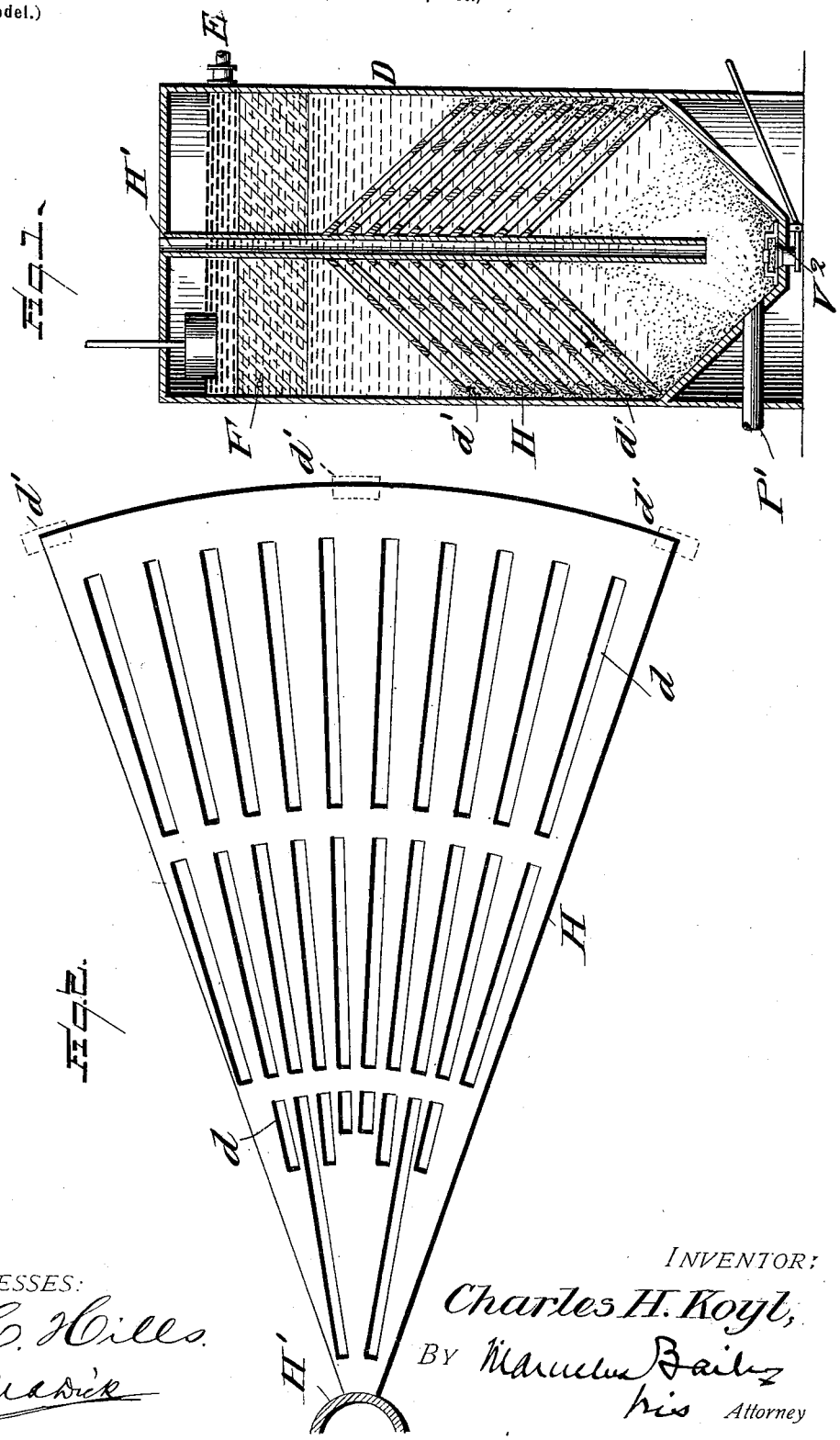

CHARLES HERSCHEL KOYL, OF NEW YORK, N. Y.

APPARATUS FOR PURIFYING WATER.

SPECIFICATION forming part of Letters Patent No. 653,012, dated July 3, 1900.

Original application filed December 20, 1899. Serial No. 740,958. Divided and this application filed February 9, 1900. Serial No. 4,621. (No model.)

*To all whom it may concern:*

Be it known that I, CHARLES HERSCHEL KOYL, of New York, in the county and State of New York, have invented a new and useful Improvement in Apparatus for the Softening and Purification of water, of which the following is a specification.

In a prior application for Letters Patent for certain improvements in apparatus for the softening and purification of water, filed December 20, 1899, Serial No. 740,958, I have described and illustrated an apparatus for this purpose comprising, among other things, tanks for the solution and subsequent supply of chemical reagents, in conjunction with a reaction-tank in which the chemicals are mixed with and act on the raw water and a settling and filtering tank within which the treated water is freed from its suspended matter.

My present application is a division of my said prior application, Serial No. 740,958, and is directed to the construction and arrangement of the settling-tank.

The invention will first be described in connection with the accompanying drawings and will then be more particularly pointed out in the claims.

In said drawings, Figure 1 is a vertical central section of the settling-tank. Fig. 2 is a view, enlarged, of one of the cone-segments of the settling-tank.

The settling-tank D receives the treated water from the reaction-tank through the pipe P', this water in its upward passage through the tank leaving its precipitates and suspended matter behind and issuing at the top through pipe E soft and clean and ready for use. The tank is provided at the bottom with a sediment-chamber formed by giving the lower end of the tank a conical or tapering shape, the bottom of said chamber being closed by a dumping-valve $V^2$, which by a suitable lever can be opened whenever it is desired to dump or discharge the accumulated sediment in the tank.

Within the settling-tank is placed a series of superposed radially slitted or perforated hollow settling-cones H, placed small end uppermost, surrounding at the center a pipe H', open at both ends, and resting at their bases or outer rims on brackets $d'$, secured at intervals apart to the inner wall of the tank, these cones nesting together, but being placed at a certain distance apart from one another. Between the outer rims of the cones and the inner wall of the tank is an annular space down through which sediment can pass to the bottom of the tank. Above the settling-cones and at or near the top of the tank is a filter-bed F.

To facilitate the settling in the tank D of the precipitates which are carried upward by the water to some distance from the bottom of the said tank, it has been customary to place within the settling-tank a series of plates, inclined so that the sediment will readily slide off and the spaces between which plates constitute, in effect, shallow settling-basins. Sometimes these plates are arranged in the shape of spirals or volutes around a central core, so that the water following the course of the spirals may deposit its precipitates on the way up; but for the sake of convenient placing and removal these spirals are generally put in as loose sheets, and the connections of the same with the core and with the circumference of the tank and with each other are so loose and open that the water finds it easier to rise through these openings than through the more tortuous channels formed by the spirals, with the result that the water does not rise slowly as a mass and settle its suspended matter, but rushes in small streams through these openings and arrives at the filter loaded with suspended matter. Another device in use is that of perforated funnels (placed small end downward) through the perforations of which the water rises with easy speed and during its slower passage from funnel to funnel settles its precipitates upon the funnel-plates, these precipitates sliding down to the central opening, which is common to all the funnels, and passing thus to the bottom of the settling-tank; but the difficulty in the use of this device is that since the circumference of the funnel gets continuously smaller as the center is approached the precipitates in the act of sliding down the surface of the funnel pass over the perforations toward the center, and thus become again suspended matter. To overcome these difficulties, I use for settling-plates a series of cones placed small end uppermost, with the result that the sediment slides outward and downward toward the wall of the settling-tank and thence to the bottom of the tank, there being an annular space between the outer rim of each cone and the wall of the tank, and since the circumference of the cone gets greater toward the bottom the result is that the unperforated sliding-surface becomes continuously greater toward the bottom of each cone and there is therefore no tendency of the precipitates to slide over the perforations, which, it should be said, are arranged in radial lines from the center of the cone to the circumference.

Since it is desirable that the water shall move upward in the settling-tank as slowly and quietly as possible and since it is desirable that the precipitates settling upon the inclined plates shall not in their downward motion cross any perforations in the plate through which they might fall into the rising water, I make the perforations in the cones in the form of radial slits, leaving only so much of the metal unperforated as is necessary to the stability of the cones and to provide an adequate settling-surface. For ease in handling, in setting up, and in removal for any purposes the cones are each composed of a series of segments which are bent to the proper curve before they are placed in position and are then set in place, resting at the bottom upon brackets $d'$, secured to the inner wall of the tank, and resting at the upper truncated points against the central rod or pipe H'. Fig. 2 shows in detail one such cone-segment, $d$ being the radially-arranged slits therein. The water after rising through the slits or perforations of the cone spasses upward through the coarse filter F, which stops any floating particles and leaves the water free and clean for use. The rod or pipe H' is hollow and is open at both ends, so that water from the lower part of the settling-tank will rise in it. By comparing the level of the water in this tube with that of the water in the tank above the filter F, I can determine whether the filter F is doing its duty or whether it is so clogged as to prevent the free and proper flow of water therethrough.

Having described my invention, what I here claim, and desire to secure by Letters Patent, is—

1. A settling-tank provided with a settling-surface composed of a series of superposed hollow cones placed small end uppermost, but separated from one another by intervals which constitute shallow settling-chambers, and provided with slits or perforations arranged in radial lines, substantially as and for the purposes hereinbefore set forth.

2. In combination with the settling-tank a series of superposed hollow radially-perforated settling-cones placed small end uppermost but separated from one another by intervals which constitute shallow settling-chambers, there being also an annular space between their outer rims and the inner wall of the tank, substantially as and for the purposes hereinbefore set forth.

3. In combination with the settling-tank and an axial core or support therein, a series of superposed settling-cones placed small end uppermost but separated from one another by intervals which constitute shallow settling-chambers and composed each of radially slitted or perforated segments II which at their inner and upper ends rest against the axial core or support, and at their outer and lower ends rest upon brackets projecting from the inner wall of the tank, substantially as and for the purposes hereinbefore set forth.

In testimony whereof I have hereunto set my hand this 3d day of February, 1900.

CHARLES HERSCHEL KOYL.

Witnesses:
OWEN E. ABRAHAM,
PHILIP EARL DUDLEY.